INVENTOR
TOKUSHI ŌI
TAKAYUKI SHIAKU

Dec. 27, 1966  TOKUSHI OI ETAL  3,294,933
GAS FLOW DETECTOR
Filed Oct. 2, 1964  2 Sheets-Sheet 2
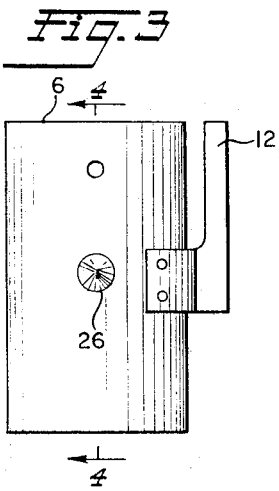
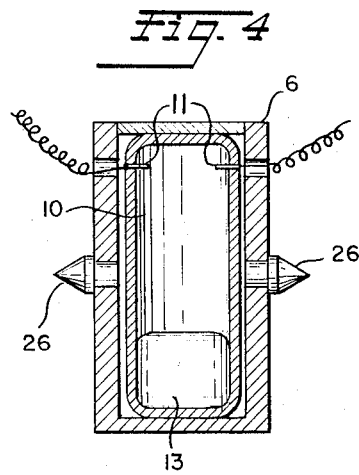
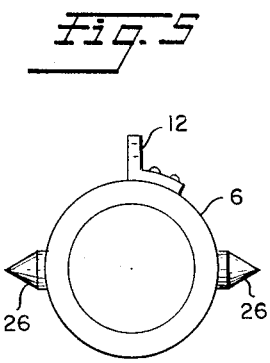
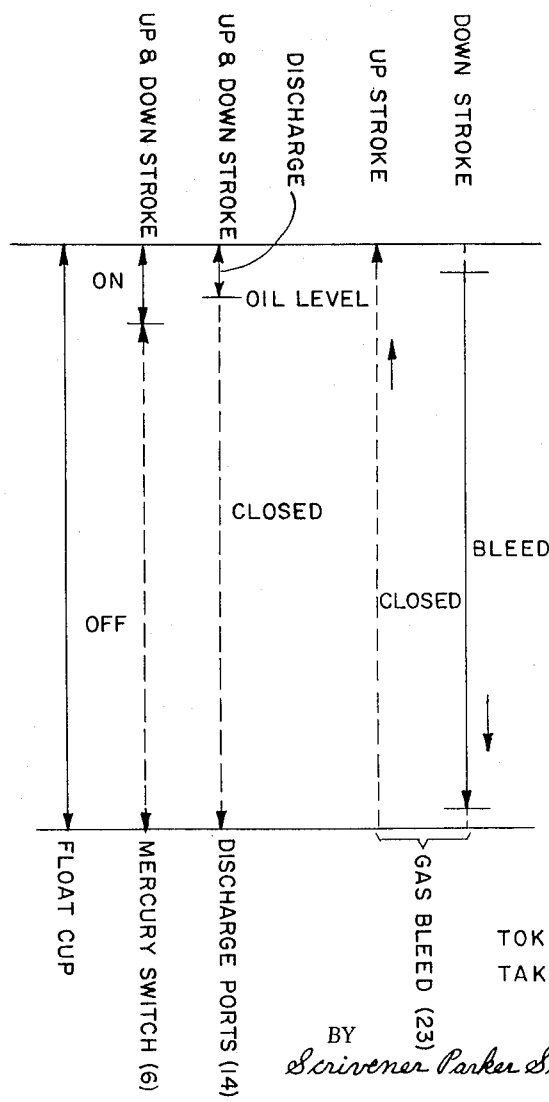
INVENTORS
TOKUSHI ŌI
TAKAYUKI SHIAKU
BY Scrivener Parker Scrivener + Clarke
ATTORNEYS

United States Patent Office 3,294,933
Patented Dec. 27, 1966

1

3,294,933
GAS FLOW DETECTOR
Tokushi Oi, 58 6-chome, Nakamachi, Nerima-ku, Tokyo-to, Japan, and Takayuki Shiaku, 29 1665 Gakuenhi-gashi-machi, Kodaira-shi, Tokyo-to, Japan
Filed Oct. 2, 1964, Ser. No. 401,112
Claims priority, application Japan, Jan. 27, 1964, 39/3,687
3 Claims. (Cl. 200—81.9)

This invention relates to a gas flow detector. The object of the present invention is to provide a physical means for mechanically detecting even the slightest leak of fuel gas flow, and for actuating an electric alarm lamp or a buzzer.

The features and advantages of this invention will become apparent from the following detailed description.

There has been no way to detect leaks of fuel gas and the like except by the sense of smell, irrespective of the leaking quantity.

As is generally known, the sense of smell gets benumbed by repetition, and it is effective only in an initial stage. It can be said with good reason that it is not only unreasonable but also dangerous to depend entirely on the sense of smell for the detection of such toxic gas as fuel gas for domestic use.

The object of the present invention consists in providing a physical means to mechanically detect even the slightest leak of fuel gas and to electrically actuate an alarm lamp or buzzer installed at a desired place to give the alarm on gas leak in order to assure safety in gas utilization by families and to minimize resistance loss and maintain required gas pressure at ordinary service time.

The gas leak detection according to the invention is characterized in that, within the body having an inlet pipe of gas on one side and an outlet on the other is installed a mount with gas passage notches at the top comprising a gas inflow chamber, the space therebetween being filled with liquid oil. The upper end of the mount is enclosed by a float cup having a gas bleed passage or vent that is initially closed by cam closure means, whereby the difference in pressure of the fluid acting on opposite sides of the float cup causes raising thereof relative to the mount. The float cup contains a plurality of apertures normally immersed in the oil, which apertures are opened when the float cup is elevated to a given position above the oil level to cause flow of gas between inlet and outlet chambers in the detector body. An equilibrium condition is reached in which the float cup is in a given upper position owing to the pressure differential between the inlet and outlet chambers. In the event that the float cup rises above this upper position as a consequence of an increase in the pressure differential (as might occur because of leakage in the outlet conduit), cam operator means open the vent closure means, whereby the pressure differential between the lower and upper chambers is eliminated, and the cup falls by gravity to its initial position. An electrical alarm system including a mercury switch is provided for presenting a visible or audible indication that the float cup is in the upper position.

An embodiment of the invention will be explained with reference to the accompanying drawings; in which:

FIG. 3 is a side elevation view of the mercury switch means;

2

Figure 1:
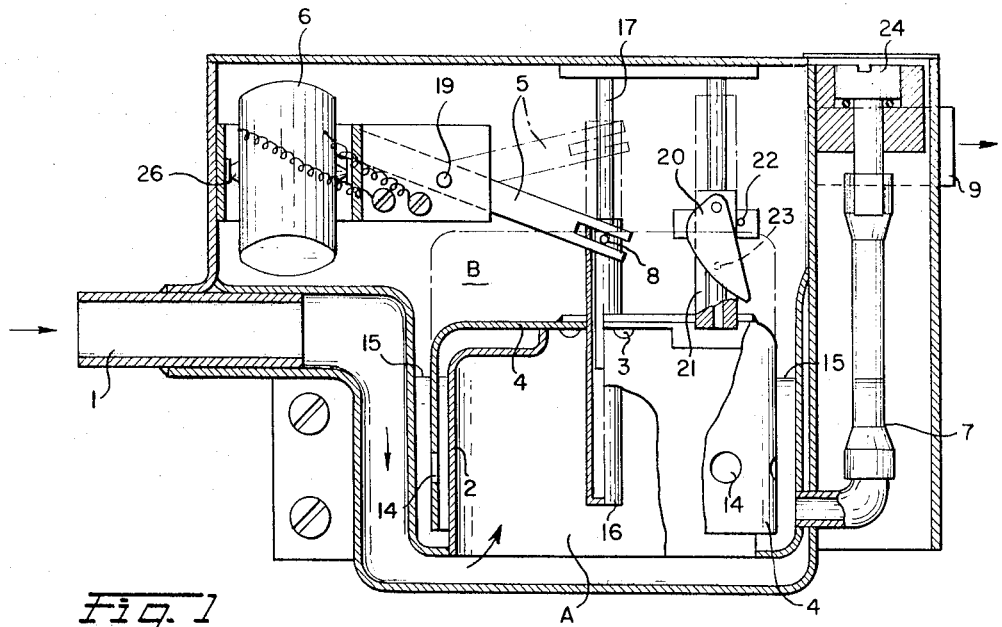
FIG. 1 is a partly sectioned elevational view of the leak detector.

FIG. 4 is a sectional view taken along line 4—4 of FIG. 3;

FIG. 5 is a top plan view of the switch means; and

FIG. 6 is a diaphragm of the operating cycle of the various components.

In the center of the body having an inlet pipe of gas 1 on one side and an outlet 9 on the other, is installed a bottle-shaped mount 2 defining a gas inflow chamber A, which has a certain number of gas passage notches 3 and to which gas from the inlet has free access. Enveloping said mount 2 and immersed at its lower portion is liquid oil 15 filling the space between said body and mount 2, is fitted a float cup 4 in the center of the crown of which is fixed a guide sleeve 16 with a connecting pin 8 forming an airtight seal with an associated guide bar 17. Mounted in the top of the cup is a support cylinder 21 having a pivotally mounted cam 20 which normally closes a gas bleed passage 23 in said cylinder. The cam, which is gravity-biased toward the illustrated closed position, has flat and curved surfaces engaged by a stationary guide pin 22 when the float cup is vertically displaced upwardly and downwardly, respectively, from its extreme limits of travel. The lower portion of the side wall of the cup contains a plurality of lateral gas discharge parts 14 that are immersed in the oil bath 15 when the float cup is in the illustrated lower position.

Figure 2:
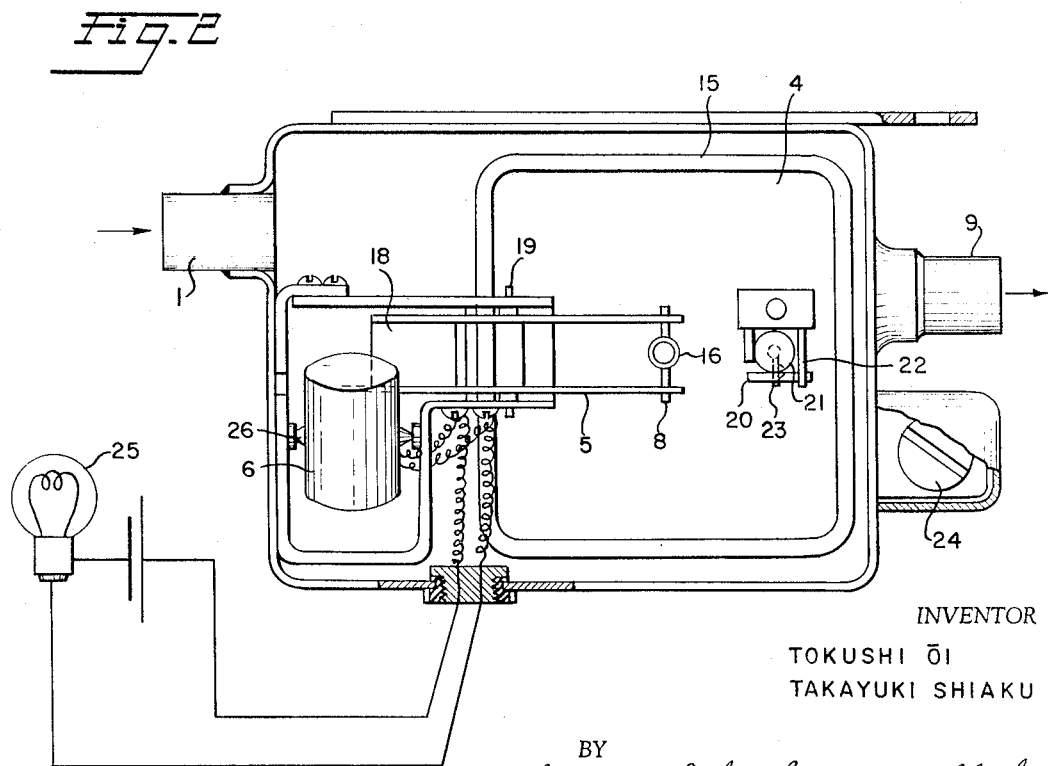
FIG. 2 is a partly sectioned plan view of the apparatus of FIG. 1, the electrical alarm system being illustrated schematically.

The guide sleeve 16 slides on a guide bar 17 secured to the body during vertical movement of the cup. Pivotally mounted within the body is a mercury switch 6 having a vial 10 containing a globule of mercury and including at one end a pair of spaced contacts 11. These contacts are connected in series with an alarm circuit including lamp 25 as shown in FIG. 2. Lever 5 pivoted about fixed pivot 19 is connected at one end with the switch housing projection 12, and at the other end is connected with a lateral pin 8 on the guide sleeve 16. The arrangement is such that as the float cup is elevated toward the upper position illustrated in phantom, lever 5 pivots switch 6 about pivot 26 to cause the mercury 13 to conductively connect the contacts 11 and thereby energize the alarm circuit including lamp 25. The oil bath 15 is filled to a given level by means of oil pipe 7 that is closed by a closure element 24.

The operating principle of the present invention is to change the leak or escape of any gas to pressure differential, which is further converted into mechanical movement to give forth an electric signal.

As illustrated in FIG. 1, the device according to the present invention comprises two gas chambers A and B, isolated by the float cup 4 half immersed in liquid oil 15 until said cup 4 is raised by pressure difference to the extent that the gas discharge ports 14 emerge from said liquid oil 15.

The inflow of gas from the inlet pipe 1 initially generates a pressure differential between the chambers A and B, which in turn raises said cup 4 until the discharge ports 14 rise above the oil 15 to give forth the gas therefrom to balance pressures. The cup is now in an upper position in which a pressure differential equilibrium condition exists. The rising of the float cup toward this upper position turns the lever 5 counterclockwise around the shaft 19 linked with the pin 8, which in turn rotates the mercury switch 6, making mercury 13 run to the electric terminals 11 in one end to close the circuit by immersion thereof, and thereby energize the alarm circuit to light lamp 25.

Assuming that the cup is in the upper balanced position, in the event that the pressure differential between the chambers A and B is increased (for example, by a gas leak in the outlet conduit 9), the cup is raised slightly above the upper equilibrium condition, whereby the cam 20 is freed from pin 22 and pivots by gravity in the counterclockwise direction to open vent 23. Since the float cup chamber (and consequently, chamber A) are now vented to chamber B the pressure differential is decreased and the float cup begins to fall. The curved surface of cam 20 engages pin 22, whereby cam 20 is rotated further in the counterclockwise direction and vent 23 is maintained open during downward movement of the float cup to its illustrated lower position. When the cup reaches the lower position, the cam will have been completely pivoted to its illustrated closed position.

Thus, an outflow of gas through said bleed 23 allows the float cup 4 to sink until it settles on the mount 2, when the mercury switch 6 is turned to run mercury 13 to the opposite end to the electric terminal 11, and the cam 20 resumes the original position and closes the bleed 23 just before the float cup 4 settles on said mount 2 by the shift of the center of gravity. Thus, it is ready for a next cycle of detection.

As described above, the present invention, instead of gas leak detection by the sense of smell and so on, can detect even a small amount of leakage or escape of fuel gas as well as great flow, and send out alarm in terms of electric change. It is featured with the following merits:

(1) Control of gas appliances installed at several points and assurance of safety as well as detection of gas leak if the gas leak detector according to the present invention is fitted at the main cocks with alarm lamps or buzzers in a managing room.

(2) If fitted to a gas appliance in combination with a bi-metal switch for detecting the temperature of flames, an outflow of gas at unexpected points or dangers arising from blown-out flames can be warned by continuous alarm of buzzers.

What we claim is:

1. A gas flow detector, comprising
a hollow body containing inlet and outlet openings;
partition means defining in said body lower and upper chambers in communication with said inlet and outlet openings, respectively, said partition means including a vertically arranged upwardly extending open ended tubular wall portion defining in the lower portion of the upper chamber a trough for receiving liquid to a given level;
a downwardly directed float cup mounted for vertical movement in said upper chamber upon said tubular wall portion, said float cup having horizontal top and downwardly extending side walls defining a cup chamber in continuous communication with said lower chamber via said tubular wall portion, the lower portion of the side wall containing at least one aperture, said cup normally having a lower position in which the lower portion of said side wall and the aperture contained therein are submerged in the liquid beneath the level thereof, said float cup containing bleed passage means for venting said float cup chamber with said upper chamber when the cup is in the lower position;
closure means normally closing said vent means, whereby when the pressure differential between the lower and upper chambers gradually increases, the float cup is progressively elevated toward an upper position in which the aperture is above the liquid level and the float cup is in a pressure differential balanced condition;
means operable when the float cup rises above said upper position to open said closure means from said vent means and to maintain the closure means open as the float cup drops to the lower position;
and electrical alarm means operable when said float cup is adjacent said upper position.

2. Apparatus as defined in claim 1 wherein said float cup includes a vertically arranged conduit containing said bleed passage, wherein said closure means comprises a gravity-biased cam pivotally connected with said conduit to normally close said bleed passage, and wherein said means for opening said closure means comprises a cam operator secured to said housing within said upper chamber for engagement by said cam during vertical movement of said float cup.

3. Apparatus as defined in claim 1, wherein said electrical alarm means includes a mercury switch pivotally mounted within said upper chamber, and lever means for operating said switch between open and closed conditions as a function of the vertical position of said float cup.

References Cited by the Examiner
UNITED STATES PATENTS

| | | | |
|---|---|---|---|
| 1,012,596 | 2/1911 | Carpenter | 200—81 X |
| 2,087,937 | 3/1937 | Kuwada | 73—237 |
| 2,625,042 | 1/1953 | Binford | 200—81 X |

BERNARD A. GILHEANY, *Primary Examiner.*

G. MAIER, *Assistant Examiner.*